(12) United States Patent
Whitman

(10) Patent No.: US 10,938,809 B2
(45) Date of Patent: *Mar. 2, 2021

(54) MOBILE ENROLLMENT USING A KNOWN BIOMETRIC

(71) Applicant: Alclear, LLC, New York, NY (US)

(72) Inventor: Stewart Whitman, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,958

(22) Filed: Dec. 30, 2019

(65) Prior Publication Data

US 2020/0322328 A1 Oct. 8, 2020

Related U.S. Application Data

(63) Continuation of application No. 16/374,576, filed on Apr. 3, 2019, now Pat. No. 10,523,671.

(51) Int. Cl.
*H04L 29/06* (2006.01)

(52) U.S. Cl.
CPC ...... *H04L 63/0861* (2013.01); *H04L 63/0853* (2013.01)

(58) Field of Classification Search
None
See application file for complete search history.

(56) References Cited

U.S. PATENT DOCUMENTS

| 7,308,581 B1 ‡ | 12/2007 | Geosimonian ........ G06F 21/32 713/182 |
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,744,966 B1 | 6/2014 | Amacker et al. |
| 8,887,259 B1 * | 11/2014 | Harding ............ G06F 21/6254 726/9 |
| 9,107,064 B1 | 8/2015 | Ramalingam et al. |
| 9,166,961 B1 | 10/2015 | Johansson et al. |

(Continued)

OTHER PUBLICATIONS

Dr. Singh, Tripty. Design of a dual biometric authentication system. 2016 International Conference on Electrical, Electronics, and Optimization Techniques (ICEEOT). https://ieeexplore.ieee.org/stamp/stamp.jsp?tp=&arnumber=7754806 (Year: 2016).*

(Continued)

*Primary Examiner* — Jeremiah L Avery
(74) *Attorney, Agent, or Firm* — Brownstein Hyatt Farber Schreck, LLP

(57) ABSTRACT

A system performs mobile biometric identification system enrollment using a known biometric. The system receives a digital representation of a first biometric for a person. Prior to using the digital representation of the first biometric to identify the person, the system compares a received digital representation of a second biometric for the person to known biometric data for the person. When the digital representation of the first biometric has been thus verified, the system is operative to identify the person using the digital representation of the first biometric.

20 Claims, 8 Drawing Sheets

(56) References Cited

U.S. PATENT DOCUMENTS

| | | | |
|---|---|---|---|
| 9,202,105 | B1 | 12/2015 | Wang et al. |
| 9,324,098 | B1 | 4/2016 | Agrawal et al. |
| 9,386,507 | B1 | 7/2016 | Ramalingam et al. |
| 9,607,138 | B1 | 3/2017 | Baldwin et al. |
| 9,609,577 | B1 | 3/2017 | Ramalingam et al. |
| 9,681,350 | B1 | 6/2017 | Marupaduga et al. |
| 9,681,359 | B2 | 6/2017 | Ramalingam et al. |
| 9,723,131 | B1 | 8/2017 | Ramalingam et al. |
| 9,836,642 | B1 | 12/2017 | Ramaswamy |
| 9,876,788 | B1 * | 1/2018 | Ziraknejad .............. G06F 21/34 |
| 9,934,504 | B2 | 4/2018 | Wang et al. |
| 9,967,250 | B2 | 5/2018 | Johansson et al. |
| 10,027,662 | B1 | 7/2018 | Mutagi et al. |
| 10,055,740 | B2 | 8/2018 | Hanson et al. |
| 10,104,181 | B1 | 10/2018 | Rao et al. |
| 10,108,791 | B1 | 10/2018 | Masterman |
| 10,108,961 | B2 | 10/2018 | Wang et al. |
| 10,122,727 | B2 | 11/2018 | Johansson et al. |
| 10,235,669 | B2 | 3/2019 | Amacker et al. |
| 10,242,364 | B2 | 3/2019 | Wang et al. |
| 10,243,945 | B1 | 3/2019 | Kruse et al. |
| 10,395,128 | B2 * | 8/2019 | Van Os .............. G06K 9/00288 |
| 2006/0110011 | A1 * | 5/2006 | Cohen ...................... G07C 9/37 382/115 |
| 2008/0289020 | A1 ‡ | 11/2008 | Cameron ............ H04L 63/0861 726/9 |
| 2009/0037978 | A1 * | 2/2009 | Luque ...................... G06K 9/00 726/2 |
| 2010/0322487 | A1 ‡ | 12/2010 | Geosimonian .......... G06F 21/32 382/115 |
| 2012/0139703 | A1 ‡ | 6/2012 | Szoke ...................... G06F 21/32 340/5.83 |
| 2013/0036459 | A1 ‡ | 2/2013 | Liberman ............. H04L 9/0866 726/6 |
| 2014/0188770 | A1 ‡ | 7/2014 | Agrafioti ................ A61B 5/117 706/13 |
| 2014/0289833 | A1 ‡ | 9/2014 | Briceno et al. ......... H04L 63/08 726/7 |
| 2014/0359722 | A1 * | 12/2014 | Schultz ................. H04L 9/3231 726/5 |
| 2016/0012217 | A1 ‡ | 1/2016 | Wolf ....................... G06F 21/83 726/18 |
| 2016/0127359 | A1 * | 5/2016 | Minter ................ H04L 63/0861 726/6 |
| 2018/0007060 | A1 ‡ | 1/2018 | Leblang et al. |
| 2018/0337917 | A1 * | 11/2018 | Wallace ............. G06K 9/00892 |
| 2019/0036939 | A1 ‡ | 1/2019 | Johansson et al. |
| 2019/0213311 | A1 * | 7/2019 | Tussy ................. G06K 9/00288 |

OTHER PUBLICATIONS

Sasireka, K.; Rajesh, R.S. Dual biometric authentication scheme for privacy protection. 2014 International Conference on Communication and Network Technologies. https://ieeexplore.ieee.org/stamp/stamp.jsp?tp=&arnumber=7062734 (Year: 2014).*

Pal. Narendra et al. A Better Matching Accuracy for Verification &Identification Using Biometric Features. 2012 Third International Conference on Computer and Communication Technology, https://ieeexplore.ieee.org/stamp/stamp.jsp?tp=&arnumber=6394698 (Year:2012).‡

Ribaric, Slobadan; Fratric, Ivan. Experimental Evaluation of Matching-Score Normalization Techniques on Different Multimodal Biometric Systems. 2006 IEEE Mediterranean Electrotechnical Conference. https://ieeexplore.ieee.org/stamp/stamp.jsp?tp=&arnumber=1653147 (Year: 2006).‡

Tong, Yan et al. Improving Biometric Identification Through Quality-based Face and Fingerprint Biometric Fusion. 2010 IEEE Computer Society Conference on Computer Vision and Pattern Recognition—Workshops. https://ieeexplore.ieee.org/stamp/stamp.jsp?tp=&arnumber=5543233 (Year: 2010).‡

MB, Srinidhi; Roy, Romil. A Web Enabled Secured System for Attendance Monitoring and Real Time Location Tracking Using Biometric and Radio Frequency Identification (RFID) Technology, 2015 ICCCI. https://ieeexplore.ieee.org/stamp/stamp.jsp?tp=&arnumber=7218103 (Year: 2015).‡

Garud, Dhanajay; Dr. Agrwal, S.S. Face Liveness Detection. 2016 International Conference on Automatic Control and Dynamic Optimization Techniques (ICACDOT), https://ieeexplore.ieee.org/stamp/stamp.jsp?tp=&arnumber=7877695&tag=1 (Year: 2016).‡

Garud et al., "Face Liveness Detection," 2016 International Conference on Automatic Control and Dynamic Optimization Techniques (ICACDOT), https://ieeexplore.ieee.org/stamp/stamp.jsp?tp=&arnumber=7877695&tag=1, 2016.

MB et al., "A Web Enabled Secured System for Attendance Monitoring and Real Time Location Tracking Using Biometric and Radio Frequency Identification (RFID) Technology," ICCCI, https://ieeexplore.ieee.org/stamp/stamp.jsp?tp=arnumber=7218103, 2015.

Pal et al., "A Better Matching Accuracy for Verification and Identification Using Biometric Features," 2012 Third International Conference on Computer and Communication Technology, http://ieeexplore.ieee.org/stamp/stamp.jsp?tp=&arnumber=6394698, 2012.

Ribaric et al., "Experimental Evaluation of Matching-Score Normalization Techniques on Different Multimodal Biometric Systems," IEEE Mediterranean Electrotechnical Conference, https://ieeexplore.ieee.og/stamp/stamp.jsp?tp=&arnumber=1653147, 2006.

Tong et al., "Improving Biometric Identification Through Quality-based Face and Fingerprint Biometric Fusion, IEEE Computer Society Conference on Computer Vision and Pattern Recognition—Workshops," https://ieeexplore.ieee.org/stamp/stamp.jsp?tp=&arnumber=5543233, 2010.

\* cited by examiner

‡ imported from a related application

MOBILE ENROLLMENT USING A KNOWN BIOMETRIC

CROSS-REFERENCE TO RELATED APPLICATION(S)

This application is a continuation patent application of U.S. patent application Ser. No. 16/374,576, filed Apr. 3, 2019 and titled "Mobile Enrollment Using a Known Biometric," the disclosure of which is hereby incorporated herein by reference in its entirety.

FIELD

The described embodiments relate generally to biometric identification. More particularly, the present embodiments relate to mobile biometric identification system enrollment using a known biometric.

BACKGROUND

Use of biometrics (such as one or more fingerprints, vein scans, palm-vein scans, voiceprints, facial images, retina images, iris images, deoxyribonucleic acid sequences, heart rhythms, gaits, and so on) to establish a person's identity is increasingly common. Biometrics may be used to unlock electronic devices, retrieve sensitive information, enter secure areas (such as airport terminals, event venues, and so on), rent or purchase goods and/or services, and so on. A variety of different technologies may be used in a variety of different implementations to establish a person's identity using biometrics.

The fidelity of a biometric refers to the degree of certainty that a particular received biometric matches biometric data that a person previously provided. However, the degree of certainty that a particular received biometric matches biometric data that a person previously provided does not necessarily mean that an identity for that person has been established. The degree to which the identity has been established relates to the degree to which the identity associated with that previously provided biometric data has been verified. If the person who provided the biometric data is not who he asserts himself to be, a high fidelity for a match would indicate that the person is the same but not that he is who he asserts himself to be.

SUMMARY

The present disclosure relates to mobile biometric identification system enrollment using a known biometric. The system receives a digital representation of a first biometric for a person. Prior to using the digital representation of the first biometric to identify the person, the system compares a received digital representation of a second biometric for the person to known biometric data for the person. When the digital representation of the first biometric has been thus verified, the system is operative to identify the person using the digital representation of the first biometric.

In various embodiments, a system for mobile biometric identification enrollment includes at least one non-transitory storage medium that stores instructions and at least one processing unit. The at least one processing unit executes the instructions to obtain a digital representation of a first biometric for a person; obtain an image of an identification token for the person; enroll the person in a biometric identification system using the digital representation of the first biometric; upon an initial attempt to identify the person using the digital representation of the first biometric, verify the digital representation of the first biometric by matching a digital representation of a second biometric for the person to data derived from the image of the identification token; and identify the person using the digital representation of the first biometric after verification.

In some examples, liveness detection is performed during capture of the digital representation of the first biometric. In various examples, the identification token is at least one of a state identification card, a driver's license, a military identification card, or a passport. In a number of examples, the identification token includes at least a picture of at least a portion of the person. In some implementations of such examples, the biometric data is derived from the picture of the at least the portion of the person. In various examples, the digital representation of the first biometric and the digital representation of the second biometric are received from different electronic devices. In a number of examples, the digital representation of the first biometric and the digital representation of the second biometric are received a same electronic device.

In some embodiments, a system for mobile biometric identification enrollment includes at least one non-transitory storage medium that stores instructions and at least one processing unit. The at least one processing unit executes the instructions to obtain a digital representation of a first biometric for a person; enroll the person in a biometric identification system using the digital representation of the first biometric; upon an initial attempt to identify the person using the digital representation of the first biometric, authenticate the digital representation of the first biometric by matching a digital representation of a second biometric for the person to known biometric data for the person; and identify the person using the digital representation of the first biometric after verification.

In various examples, the first biometric is at least one fingerprint and the second biometric is at least a portion of a face. In some examples, the first biometric is at least a portion of a face and the second biometric is at least one fingerprint. In a number of examples, the digital representation of the first biometric is received from an electronic device controlled by the person. In various examples, the first biometric is of a first modality and the second biometric is of a second modality. In a number of examples, the first biometric and the second biometric are of a same modality. In some examples, the at least one processing unit prompts for the digital representation of the second biometric.

In a number of embodiments, a system for mobile biometric identification enrollment includes at least one non-transitory storage medium that stores instructions and at least one processing unit. The at least one processing unit executes the instructions to obtain a digital representation of a first biometric for a person; enroll the person in a biometric identification system using the digital representation of the first biometric; authenticate the digital representation of the first biometric by determining that a digital representation of a second biometric for the person matches a digital representation of the known biometric; and identify the person using the digital representation of the first biometric after verification.

In some examples, the at least one processing unit receives an indication that the digital representation of the second biometric matches the digital representation of the known biometric. In various implementations of such examples, the indication is an authorization token. In a number of examples, the at least one processing unit cannot access the digital representation of the second biometric. In various examples, the at least one processing unit verifies the digital representation of the first biometric when identifying the person using the digital representation of the first biometric. In some examples, the at least one processing unit disables identification for the person upon unsuccessfully attempting to authenticate the digital representation of the first biometric.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
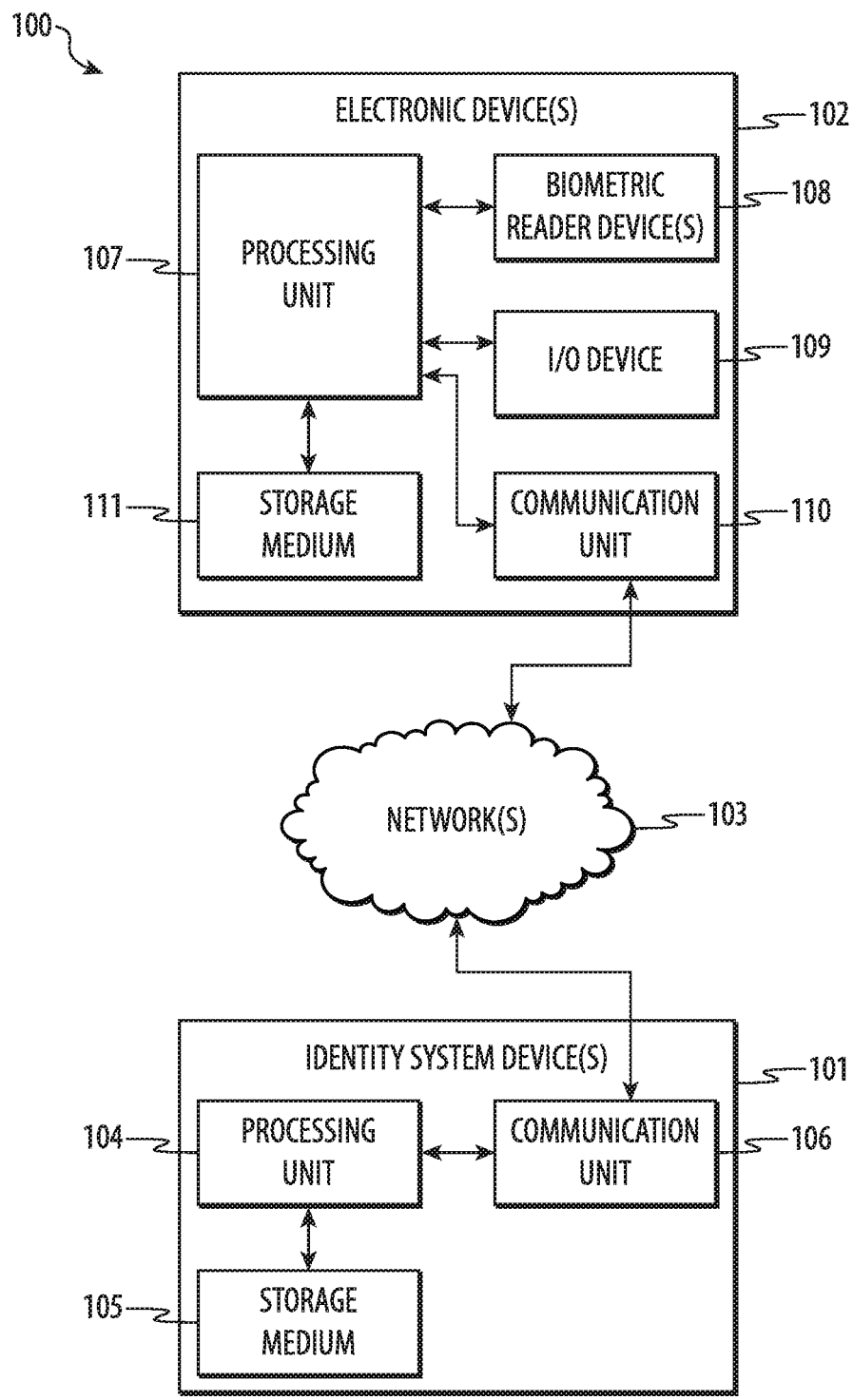
FIG. 1 depicts a first example system for mobile biometric identification enrollment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Identification systems may be dependent on the validity of the enrollment information and/or the authenticity of the identity associated with the enrollment information. If invalid biographic information is provided at enrollment or if biographic information is provided that is not associated with the person who provides the digital representation of the biometric and/or the identity associated with the biographic information is not authentic, misidentification may occur. Identification performed by such an identification system may not be highly accurate.

For example, a person could provide biographic information for another person (such as by providing a forged driver's license) while allowing a picture of himself or herself to be captured. By way of another example, a person could provide information from his or her own driver's license while holding up an image of another person to be captured. Identification of the person using the captured picture in either case may be inaccurate.

In some implementations, a person may enroll in an identification system at a facility controlled by an entity that operates the identification system or one of its agents. In such an implementation, the entity or its agents may be able to inspect presented identification, perform background checks, monitor how biometrics are captured, and so on in order to validate and/or authenticate the identity of the person who is enrolled. However, this may be burdensome on both the person enrolled and the entity or its agents. Such a burden may be partially or fully mitigated if a person could enroll mobile from the entity or its agents (such as using the person's own cell phone, tablet, laptop, and/or other mobile or non-mobile electronic device) while still allowing the entity or its agents to validate and/or authenticate the identity of the enrolled person.

The following disclosure relates to mobile biometric identification system enrollment using a known biometric. The system receives a digital representation of a first biometric for a person. Prior to using the digital representation of the first biometric to identify the person, the system compares a received digital representation of a second biometric for the person to known biometric data for the person. When the digital representation of the first biometric has been thus verified, the system is operative to identify the person using the digital representation of the first biometric.

In this way, identification systems and/or the electronic devices used in such identification systems may be capable of performing enrollment, identity validation and/or identification and/or authentication, and other functions that they were not previously capable of performing. The identification systems may be thus able to operate more efficiently and consume fewer resources, resulting in improved operation of the identification systems and/or the electronic devices used in and/or with such identification systems.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts a first example system 100 for mobile biometric identification system enrollment using a known biometric. The system 100 may include one or more identity system devices 101 and/or electronic devices 102 that may communicate with each other via one or more wired and/or wireless communication networks 103.

The system 100 may perform mobile biometric identification system enrollment using a known biometric. By way of illustration, a person may use a smart phone or other personal electronic device to take an image of one or more of the person's fingerprints. The image or a hash or other digital representation thereof may be used to enroll the person. Prior to use of the image to identify the person, the image may be verified by comparing one or more images of the person's face, iris, retina, and so on to a known picture of the person (such as one obtained from an identity token like a driver's license, state identification card, military identification card, passport, and so on). In some situations, the person may enroll remotely with the fingerprint image and then be prompted to allow the person's facial image to be recorded for verification when the person first attempts to be identified (such as at an airport security screening station, when attempting to access a financial account via the smart phone, at a ticketing station at an event venue, and so on).

In another example, a person may use a smart phone to access an enrollment application for which the person has generated a password-protected account. The person may have configured the application to allow access using a fingerprint sensor feature provided by the smart phone that provides an authentication token associated with the password in response to the person providing a fingerprint matching one stored by the phone. As such, the person may use the application to capture an image of the person's face or portion thereof and the fingerprint sensor feature to authenticate the facial image.

For example, the identity system device 101 may obtain a digital representation of a first biometric for a person from the electronic device 102; enroll the person in a biometric identification system using the digital representation of the first biometric (and/or add the digital representation of the first biometric to an existing account for the person in the biometric identification system); and authenticate the digital representation of the first biometric by determining that a digital representation of a second biometric for the person (received from the electronic device 102 and/or from a different electronic device 102) matches a digital representation of a known biometric. The identity system device 101 may be operative to identify the person using the digital representation of the first biometric (received from the electronic device 102 and/or from a different electronic device 102) after verification.

In some implementations, the first and second biometrics may be of different modalities (or different types of biometrics, such as a fingerprint being a first modality and a facial or iris or retina being a second modality). However, in other implementations, the first and second biometrics may be of the same modality (such as fingerprints from different fingers, images of different portions of the person's face, and so on).

By way of another example, the identity system device 101 may obtain a digital representation of a first biometric for a person from the electronic device 102; enroll the person in a biometric identification system using the digital representation of the first biometric (and/or add the digital representation of the first biometric to an existing account for the person in the biometric identification system); and upon an initial attempt to identify the person using the first biometric (received from the electronic device 102 and/or from a different electronic device 102), authenticate the digital representation of the first biometric by matching a digital representation of a second biometric for the person (received from the electronic device 102 and/or from a different electronic device 102) to known biometric data for the person. The identity system device 101 may identify the person using the digital representation of the first biometric (received from the electronic device 102 and/or from a different electronic device 102) after verification.

In still another example, the identity system device 101 may obtain a digital representation of at least one fingerprint for a person from the electronic device 102; obtain an image of an identification token for the person from the electronic device 102; enroll the person in a biometric identification system using the digital representation of the at least one fingerprint (and/or add the digital representation of the first biometric to an existing account for the person in the biometric identification system); and upon an initial attempt to identify the person using the digital representation of the at least one fingerprint, authenticate the digital representation of the at least one fingerprint by matching a digital representation of at least a portion of a facial image for the person (received from the electronic device 102 and/or from a different electronic device 102) to data derived from the image of the identification token. The identity system device 101 may identify the person using the digital representation of the at least one fingerprint (received from the electronic device 102 and/or from a different electronic device 102) after verification.

The identity system device 101 may store and/or track a variety of different information related to the identities of various people. This identity information may include, but is not limited to, one or more names, addresses, telephone numbers, notification preferences and/or other notification information, social security numbers, frequent flyer numbers, financial data, financial account numbers, verified ages, boarding pass data, flight data, movement data, historic movement data, and so on. The identity system device 101 may control access to the identity information as part of responding to requests and/or providing one or more attestations. The identity system device 101 may control access to the identity information using various mechanisms such as through matching of a received hash and/or other digital representation of a biometric with biometric data associated with the identity information, determining that a requestor is authorized to access identity data, receipt of authorized account logins and/or passwords, authorization tokens, and/or other access control mechanisms, and so on. For example, the identity system device 101 may be operative to identify people, authenticate that people have a valid identity token (such as a driver's license, state identification card, military identification card, passport, and so on), authenticate that people have a valid boarding pass and/or other flight or ticket, authorize people to enter an area (such as a security screening checkpoint), and so on.

In various examples, liveness detection may be performed during capture of one or more biometrics. For example, one or more cameras may be used to monitor biometric capture. By way of another example, movement tracking may be performed to ensure that biometrics from a living person are being captured. In other examples, facial recognition biometrics that do not use monitoring for verification may instead use various image and/or video processing techniques that evaluate eye movement or other features or characteristics in the images used for facial recognition during capture, such as by flashing various colored lights and/or sequences of such and evaluating iris dilation responses to the lights as compared to predicted iris dilation responses.

In various examples, where an identification token is scanned and/or otherwise imaged or captured (such as using optical character recognition of text to obtain biographic information), various techniques may be used to authenticate the identification token. For example, white light to authenticate that a piece of identification and/or other identification token is genuine.

The electronic device 102 may be any kind of electronic device. Examples of such devices include, but are not limited to, one or more desktop computing devices, laptop computing devices, mobile computing devices, wearable devices, tablet computing devices, mobile telephones, smart phones, printers, displays, kiosks, vehicles, kitchen appliances, entertainment system devices, digital media players, and so on. The electronic device 102 may include one or more processors 107 and/or other processing units and/or controllers, one or more non-transitory storage media 111

(which may take the form of, but is not limited to, a magnetic storage medium; optical storage medium; magneto-optical storage medium; read only memory; random access memory; erasable programmable memory; flash memory; and so on), one or more input and/or output devices (such as one or more keyboards, computer mice, touch screens, touch pads, track pads, microphones, speakers, displays, buttons, dials, switches, printers, and so on), one or more communication units 110, one or more biometric reader devices 108 (such as a fingerprint scanner, a vein scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), one or more input and/or output components 109 (such as one or more displays, touch screens, track pads, touch pads, keyboards, computer mice, buttons, sliders, microphones, speakers, printers, and so on), and/or one or more other components. The processor 107 may execute one or more sets of instructions stored in the non-transitory storage media 111 to perform various functions, such as using the biometric reader device 108 to obtain one or more digital representations of one or more biometrics (such as one or more hashes and/or other digital representations of one or more fingerprints, vein scans, palm-vein scans, voiceprints, facial images, retina images, iris images, deoxyribonucleic acid sequences, heart rhythms, gaits, and so on) for a person, communicate with the identity system device 101 via the network 103 using the communication unit 110, providing one or more obtained digital representations of biometrics, and so on.

Similarly, the identity system device 101 may be any kind of electronic device and/or cloud and/or other computing arrangement and may include one more processors 104, non-transitory storage media 105, communication units 106, and/or other components. The processor 104 may execute one or more sets of instructions stored in the non-transitory storage medium 105 to perform various functions, such as storing biometric data for people and associated identity information (such as one or more names, addresses, telephone numbers, financial data, financial account numbers, verified ages, insurance identifiers, payment account identifiers, and so on), receive one or more digital representations of biometrics, match one or more received digital representations of biometrics to stored biometric data, retrieve identity information associated with stored biometric data matching one or more received digital representations of biometrics, provide retrieved identity information, communicate with the electronic device 102 via the network 103 using the communication unit 106, and so on.

Although the system 100 is illustrated and described as including particular components arranged in a particular configuration that perform particular functions, it is understood that this is an example. In various implementations, various arrangements of various components that perform various functions may be implemented without departing from the scope of the present disclosure.

For example, the system 100 is illustrated as including one electronic device 102. However, it is understood that this is an example. In some implementations, the system may include multiple electronic devices 102. For example, a person may use a first electronic device 102 (such as a personal smart phone, laptop computing device, desktop computing device, digital media player, kiosk or other station, wearable device, and so on) to enroll and then get identified and/or have one or more previously provided biometrics verified by a second electronic device 102 (such as a security screening station, a ticketing station, a kiosk or other station, and so on). Various configurations are possible and contemplated without departing from the scope of the present disclosure.

Figure 2A:
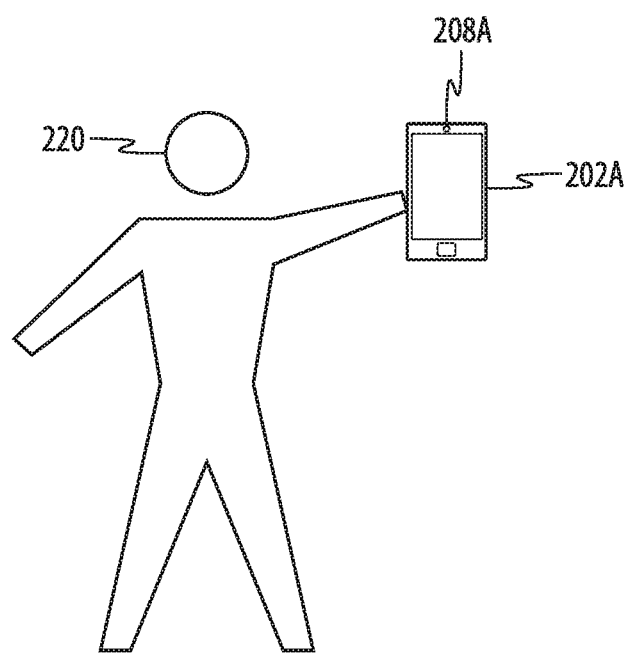
FIG. 2A depicts a first portion of an example implementation of the system of FIG. 1.

FIG. 2A depicts a first portion of an example implementation of the system 100 of FIG. 1. In this example, a person 220 may use a smart phone 202A to enroll by capturing one or more images of one or more of the person's fingerprints using a camera 208A of the smart phone 202A. After enrolling, the person 220 may then go to a place and attempt to provide the fingerprint to identify himself.

Figure 2B:
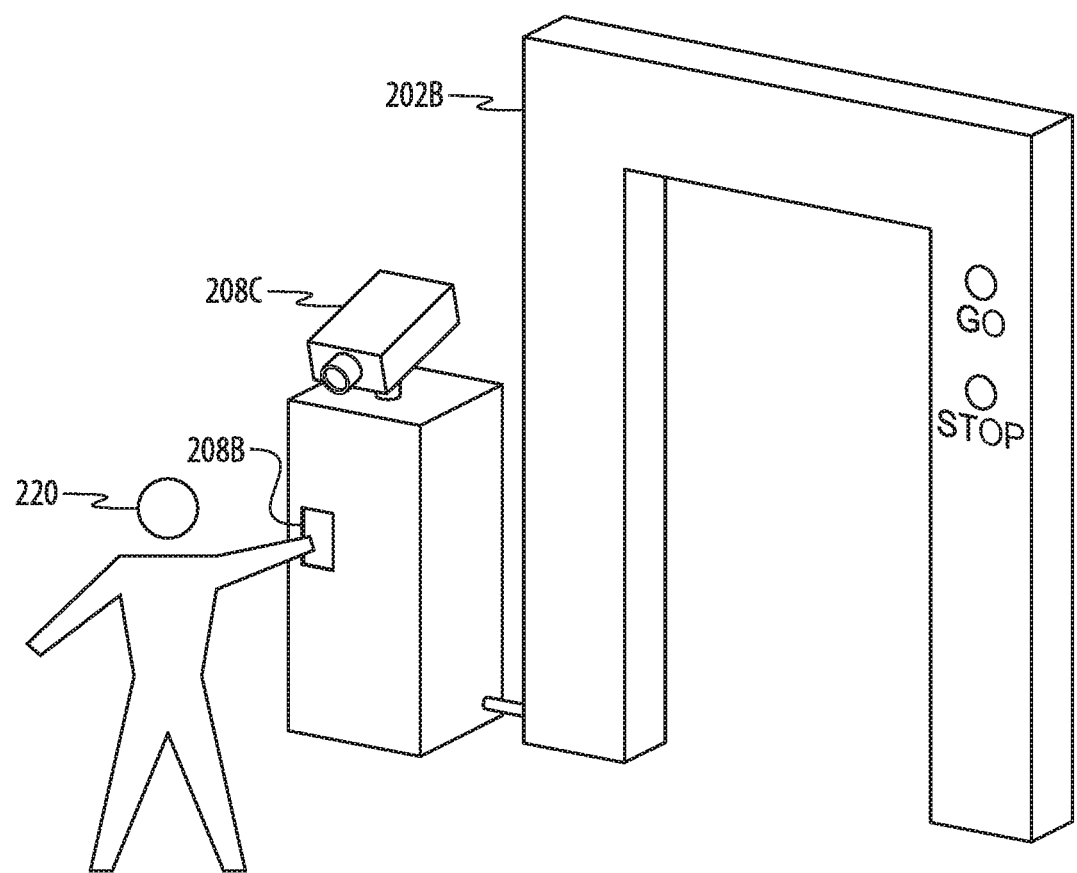
FIG. 2B depicts a second portion of the example implementation of the system of FIG. 1 shown in FIG. 2A.

For example, FIG. 2B depicts a second portion of the example implementation of the system 100 of FIG. 1 shown in FIG. 2A. In this example, the person 220 may attempt to enter a security screening gate 202B at an airport by providing the fingerprint via a fingerprint scanner 208B. As this is the first time that the person 220 has attempted to identify himself using the fingerprint, the fingerprint may not yet be verified. As such, a camera 208C may capture (whether automatically and/or in response to prompting the person 220) an image of the person's face to compare to a known image of the person's face (such as one captured from the person's driver's license or other identity token scanned during enrollment). If there is a match, the person's fingerprint may be verified and may then be used for identification. Various configurations are possible and contemplated without departing from the scope of the present disclosure.

Figure 3:
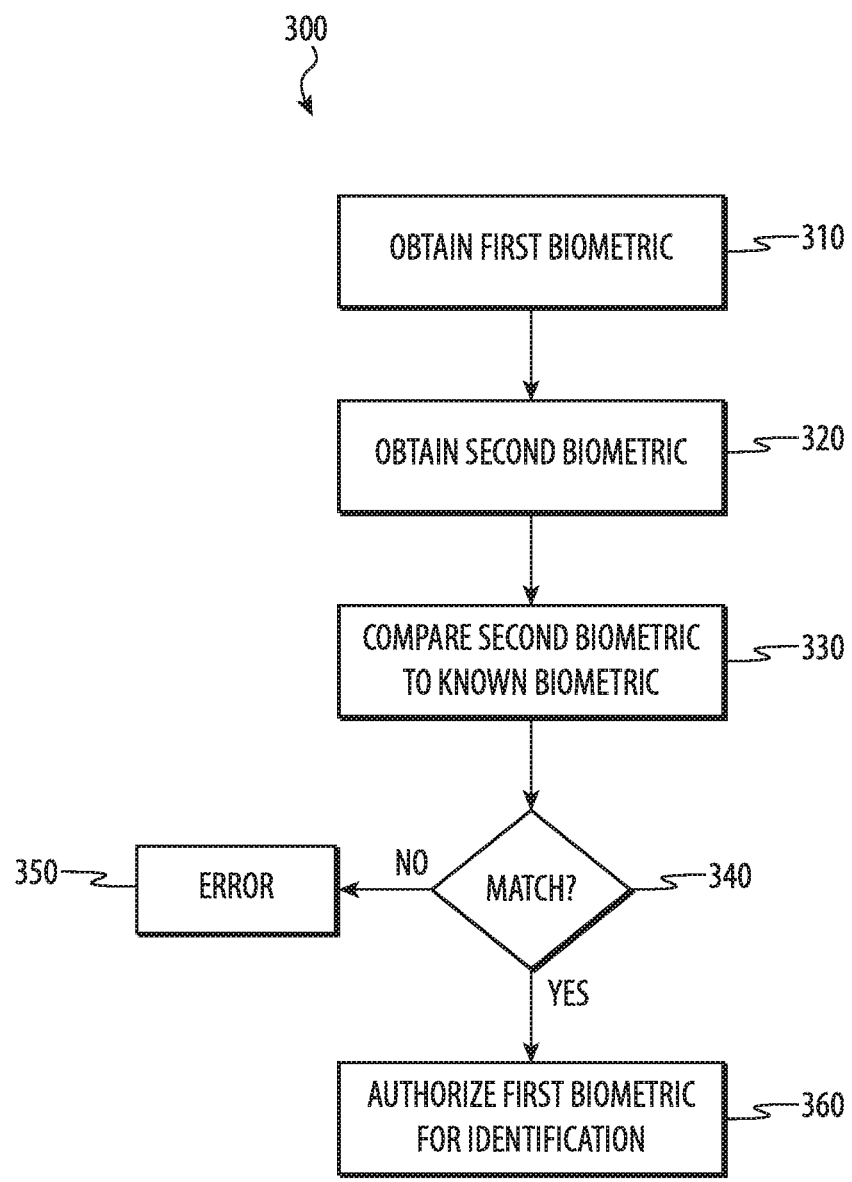
FIG. 3 depicts a flow chart illustrating a first example method for mobile biometric identification system enrollment using a known biometric. This method may be performed by the system of FIG. 1.

FIG. 3 depicts a flow chart illustrating a first example method 300 for mobile biometric identification system enrollment using a known biometric. This method 300 may be performed by the system 100 of FIG. 1.

At operation 310, an electronic device (such as the identity system device 101 of FIG. 1), may obtain a digital representation of a first biometric. At operation 320, the electronic device may obtain a digital representation of a second biometric. At operation 330, the electronic device may compare the digital representation of the second biometric to known biometric data (such as a scan of picture of person or a portion thereof from an identification token like a driver's license). At operation 340, the electronic device may determine if there is a match. If not, the flow may proceed to operation 350 where the electronic device may determine that an error has occurred. Otherwise, the flow may proceed to operation 360 where the electronic device may authenticate the first biometric by authorizing the first biometric for use in identification.

For example, the digital representation of the first biometric may be a fingerprint and the digital representation of the second biometric may be a portion of a facial image. In another example, the digital representation of the first biometric may be a portion of a facial image and the digital representation of the second biometric may be a fingerprint. In some examples, the first and second biometrics may be of the same modality. In other examples, the first and second biometrics may be of different modalities. In various examples, the digital representation of the first biometric and the digital representation of the second biometric may be received from different devices (such as a tablet computing device and a ticketing station). In other examples, the digital representation of the first biometric and the digital representation of the second biometric may be received from the same device (such as a laptop computing device that is used to enroll in a biometric identification service using the first biometric and then authenticate the first biometric using the second biometric).

By way of illustration, a person may use an app on a smart phone or other mobile device to capture images of one or more of the person's fingerprints and at least a portion of the person's face using a camera or other 2D or 3D image sensor or 3D scanner. The person may already have an account with a biometric identification service associated with the app and may previously have provided the fingerprint while monitored by an authorized agent. In such a scenario, the facial image or digital representation thereof may be verified by matching the fingerprint image or digital representation thereof to the previously verified fingerprint data. The verified facial image or digital representation thereof may then be associated with the person's account with the biometric identification service. Alternatively, in another example, the person may have previously verified a facial image and the fingerprint image or digital representation thereof may be verified by matching the facial image or digital representation thereof to the previously verified facial data. Various configurations are possible and contemplated without departing from the scope of the present disclosure.

By way of another illustration, a person may use an app on a smart phone or other mobile device to capture images of one or more of the person's fingerprints, at least a portion of the person's face, and an identification token such as a driver's license using a camera or other 2D or 3D image sensor or 3D scanner. The app may capture the facial image and the fingerprint image to ensure that the images come from the same person (such as by monitoring capture of both, by taking both at the same time, and so on). The fingerprint image may be verified by matching the facial image or digital representation thereof to an image of at least a portion of the person obtained from the identification token. The app may then enroll the person in a biometric identification service using the fingerprint image or digital representation thereof and/or the facial image or digital representation thereof and/or the image of the identification token or digital representation thereof. Various configurations are possible and contemplated without departing from the scope of the present disclosure.

Although the above describes obtaining the known biometric by capturing one or more images of the identification token using a camera or other 2D or 3D image sensor or 3D scanner, it is understood that this is an example. In some implementations, an identification token may include a data storage and/or other encoding mechanism that is operative to store biometric data for a person alternatively and/or additionally to including a picture of at least a portion of the person, such as an identification token that includes a picture of at least a portion of a person and a data storage component storing a digital version of the picture. For example, an identification token may include a smart chip, non-transitory storage medium, and so on that may store and/or encode known biometric data for a person associated with the identification token. The identification token may also include one or more mechanisms for retrieving the stored and/or encoded known biometric data (such as magnetically, optically via one or more bar codes or similar mechanisms, radio frequency identification or other near field or other wireless communication, one or more communication contacts and so on. In such implementations, the known biometric data may be retrieved from where it is stored and/or encoded by the identification token and compared to verify one or more obtained digital representations of one or more biometrics. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the identity system device 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as both obtaining the first and second biometrics and authorizing the first biometric for use in identification. However, it is understood that this is an example. In various implementations, one or more of these operations may be omitted. Various configurations are possible and contemplated without departing from the scope of the present disclosure.

Figure 4:
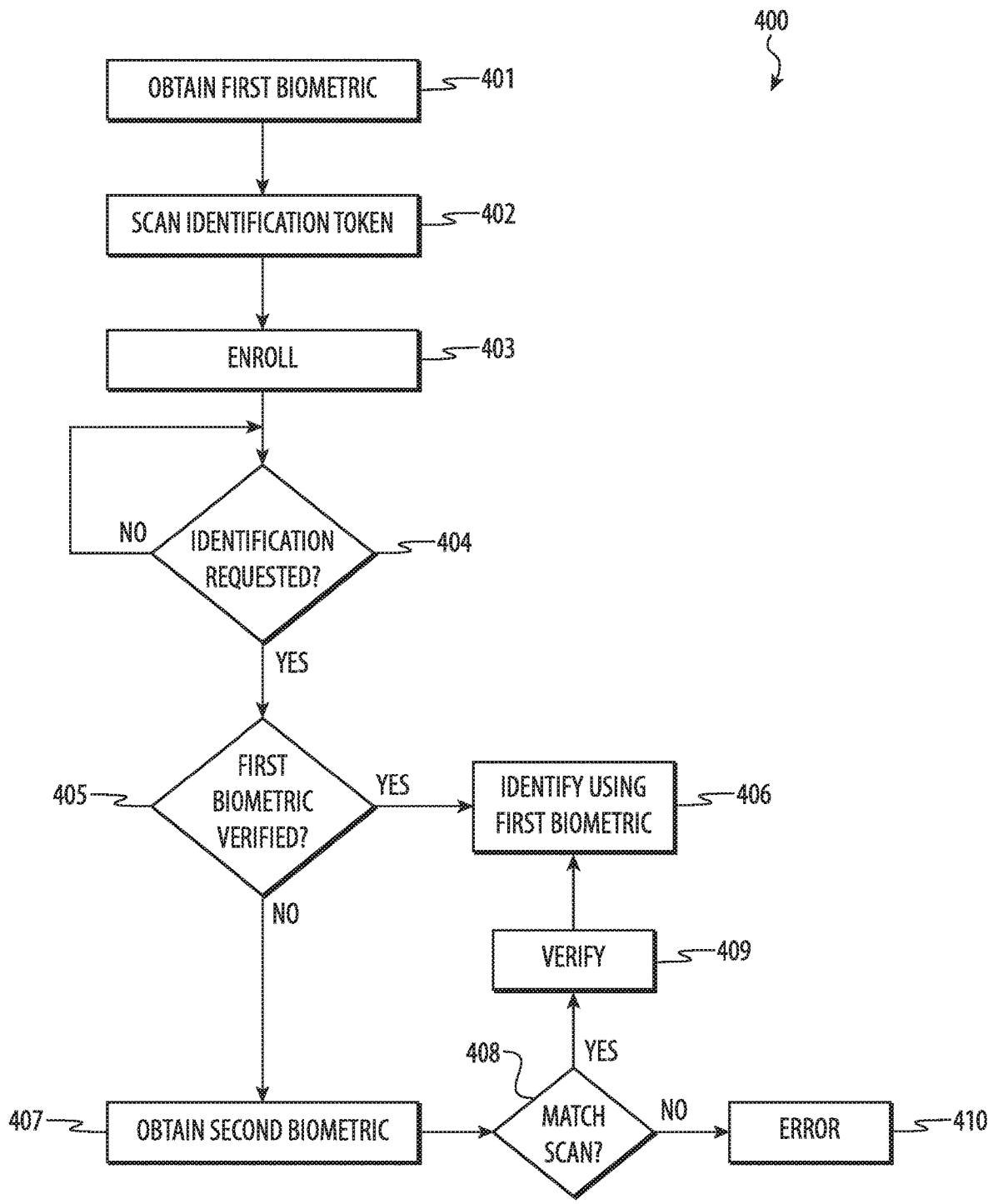
FIG. 4 depicts a flow chart illustrating a second example method for mobile biometric identification system enrollment using a known biometric. This method may be performed by the system of FIG. 1.

FIG. 4 depicts a flow chart illustrating a second example method 400 for mobile biometric identification system enrollment using a known biometric. This method 400 may be performed by the system 100 of FIG. 1.

At operation 401, an electronic device (such as the identity system device 101 of FIG. 1), may obtain a digital representation of a first biometric. At operation 402, the electronic device may scan an identification token or obtain such a scan or other image. Scanning the identification token may include capturing a picture on the identification token, obtaining biographic information from the identification token, authenticating that the identification token is valid, and so on. At operation 403, the electronic device may use the digital representation of the first biometric and/or the scan to enroll in a biometric identification system.

At operation 404, the electronic device may determine whether or not an identification is requested using the identification system. For example, a person may provide a biometric at a security screening station. If not, the flow returns to operation 404 where the electronic device again determines whether or not an identification is requested. Otherwise, the flow may proceed to operation 405 where the electronic device may determine whether or not the digital representation of the first biometric is verified or authenticated.

For example, the digital representation of the first biometric may not be verified if this is the first time that the person has attempted identification. If the digital representation of the first biometric is verified, the flow may proceed to operation 406 where the electronic device may perform an identification using the digital representation of the first biometric. Otherwise, the flow may proceed to operation 407 where the electronic device may obtain a digital representation of a second biometric.

The flow may then proceed to operation 408 where the electronic device may determine whether or not the digital representation of the second biometric matches the scan of the identification token. If not, the flow may proceed to operation 410 where the electronic device may determine that an error has occurred. Otherwise, the flow may proceed to operation 409 where the electronic device may authenticate or verify the digital representation of the first biometric before proceeding to operation 406 and performing an identification using the digital representation of the first biometric.

In various examples, this example method 400 may be implemented as a group of interrelated software modules or components that perform various functions discussed herein. These software modules or components may be executed within a cloud network and/or by one or more computing devices, such as the identity system device 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as both enrolling in the biometric identification system and using the biometric identification system to identify. However, it is understood that this is an example. In various implementations, one or more of these operations may be omitted. Various configurations are possible and contemplated without departing from the scope of the present disclosure.

Figure 5:
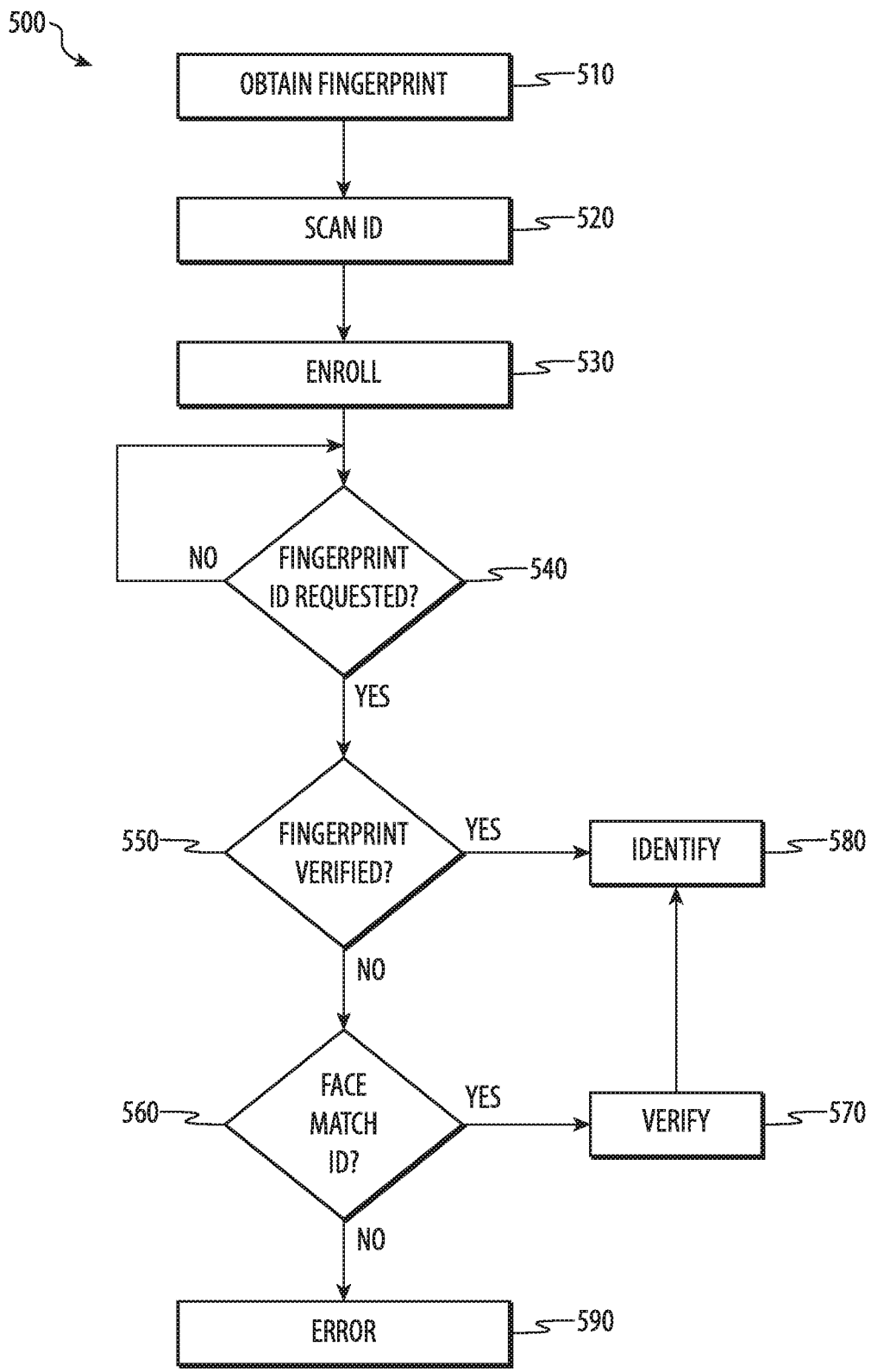
FIG. 5 depicts a flow chart illustrating a third example method for mobile biometric identification system enrollment using a known biometric. This method may be performed by the system of FIG. 1.

FIG. 5 depicts a flow chart illustrating a third example method 500 for mobile biometric identification system enrollment using a known biometric. This method 500 may be performed by the system 100 of FIG. 1.

At operation 510, an electronic device (such as the identity system device 101 of FIG. 1), may obtain a digital representation of one or more fingerprints. At operation 520, the electronic device may scan an identification token. At operation 530, the electronic device may use the digital representation of the fingerprint and/or the scan to enroll in a biometric identification system. At operation 540, the electronic device may determine whether or not an identification using the digital representation of the fingerprint is requested. If not, the flow returns to operation 540 where the electronic device again determines whether or not an identification using the digital representation of the fingerprint is requested. Otherwise, the flow may proceed to operation 550 where the electronic device may determine whether or not the digital representation of the fingerprint is verified or authenticated. If the digital representation of the fingerprint is verified, the flow may proceed to operation 580 where the electronic device may perform an identification using the digital representation of the fingerprint. Otherwise, the flow may proceed to operation 560 where the electronic device may determine whether or not a digital representation of at least a portion of a facial image matches a portion of a picture from the identification token. If not, the flow may proceed to operation 590 where the electronic device may determine that an error has occurred. Otherwise, the flow may proceed to operation 570 where the electronic device may authenticate or verify the digital representation of the fingerprint before proceeding to operation 580 and performing an identification using the digital representation of the fingerprint.

In various examples, this example method 500 may be implemented as a group of interrelated software modules or components that perform various functions discussed herein. These software modules or components may be executed within a cloud network and/or by one or more computing devices, such as the identity system device 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as matching a facial image to a known facial image to authenticate a fingerprint. However, it is understood that this is an example. In other examples, a fingerprint may be compared to a known fingerprint in order to authenticate a facial image. Various configurations are possible and contemplated without departing from the scope of the present disclosure.

Figure 6:
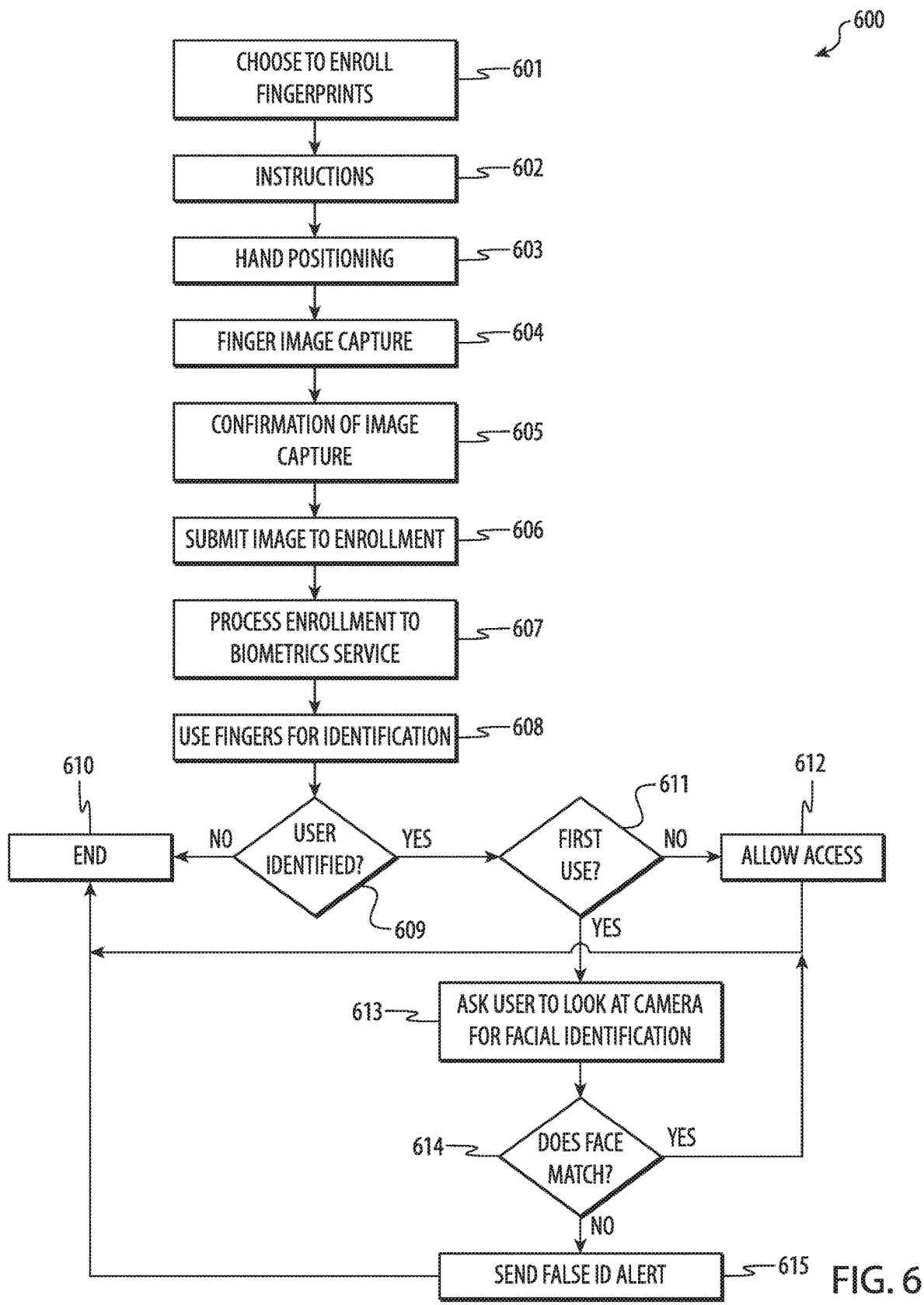
FIG. 6 depicts a flow chart illustrating a fourth example method for mobile biometric identification system enrollment using a known biometric. This method may be performed by the system of FIG. 1.

FIG. 6 depicts a flow chart illustrating a fourth example method 600 for mobile biometric identification system enrollment using a known biometric. This method 600 may be performed by the system 100 of FIG. 1.

At operation 601, a system (such as the system 100 of FIG. 1), may allow a person to choose to enroll fingerprints in a biometric identification system. At operation 602, the system may provide instructions for enrolling the fingerprints. At operation 603, the system may allow the person to position the person's hand for capture of one or more images of the fingerprints. At operation 604, the system may capture one or more images of the fingerprints (such as a white light color picture of the fingers that may be converted into Wavelet Scalar Quantization or "WSQ" compatible images). At operation 605, the system may confirm capture of the image of the fingerprints.

At operation 606, the system may submit the image and/or a hash or other digital representation thereof. At operation 607, the system may process enrollment to a biometrics service of the biometric identification system using the image.

At operation 608, the system may use the image for identification. At operation 609, the system may determine whether or not the user is identified. If not, the flow may proceed to operation 610 where the process ends. Otherwise, the flow may proceed to operation 611 where the system determines whether or not this is the first time the image has been used for identification.

If not, the flow may proceed to operation 612 where the system may allow access. Otherwise, the flow may proceed to operation 613 where the system may prompt the person to look at a camera or other 2D and/or 3D image sensor for facial verification. At operation 614, the system may determine whether or not the facial image captured as part of the facial verification matches a stored facial image. If so, the flow may proceed to operation 612 where the system may allow access. Otherwise, the flow may proceed to operation 615 where the system may send a false identification alert and suspend and/or lock the person's account in the biometric identification system before the flow proceeds to operation 610 and ends.

In various examples, this example method 600 may be implemented as a group of interrelated software modules or components that perform various functions discussed herein. These software modules or components may be executed within a cloud network and/or by one or more computing devices, such as the identity system device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 includes operations related to providing instruction for biometric capture, enrolling, and identification. However, it is understood that this is an example. In other examples, one or more of these operations may be omitted. Various configurations are possible and contemplated without departing from the scope of the present disclosure.

By way of another example, the method 600 is illustrated and described as authenticating the fingerprints using facial recognition the first time that the fingerprints are used. However, in some examples, fingerprint or other biometric capture may either be monitored (such as by an authorized agent of the biometric identification system) or submitted remotely. In such an example, the fingerprints or other biometrics may be flagged as monitored or unmonitored during capture. Monitored captures may not be verified using facial or other biometric recognition upon first use whereas unmonitored captures may be. Various configurations are possible and contemplated without departing from the scope of the present disclosure.

By way of yet another example, the method 600 is illustrated and described as authenticating biometrics of a fingerprint modality using biometrics of a facial modality. However, it is understood that this is an example. In various implementations, biometrics of one or more different modalities other than fingerprints may be verified using biometrics of one or more modalities other than facial images. Various configurations are possible and contemplated without departing from the scope of the present disclosure.

In yet another example, the method 600 is illustrated and described as using facial images to authenticate fingerprints upon first identification. However, it is understood that this is an example. In other implementations, the person may provide fingerprints for enrollment and then identify using facial recognition. In such an example, the person may be verified and may then use either facial recognition or fingerprints for identification without any further verification. Various configurations are possible and contemplated without departing from the scope of the present disclosure.

By way of still another example, the method 600 is illustrated and described as authenticating the fingerprints using facial recognition only the first time the fingerprints are used. However, it is understood that this is an example. In some examples, the fingerprints may be verified various numbers of times. By way of illustration, different entities may authenticate the fingerprints and some may be more reliable than others. When a more reliable entity performs the verification, verification may be performed fewer times than when a less reliable entity performs the verification. Various configurations are possible and contemplated without departing from the scope of the present disclosure.

Figure 7:
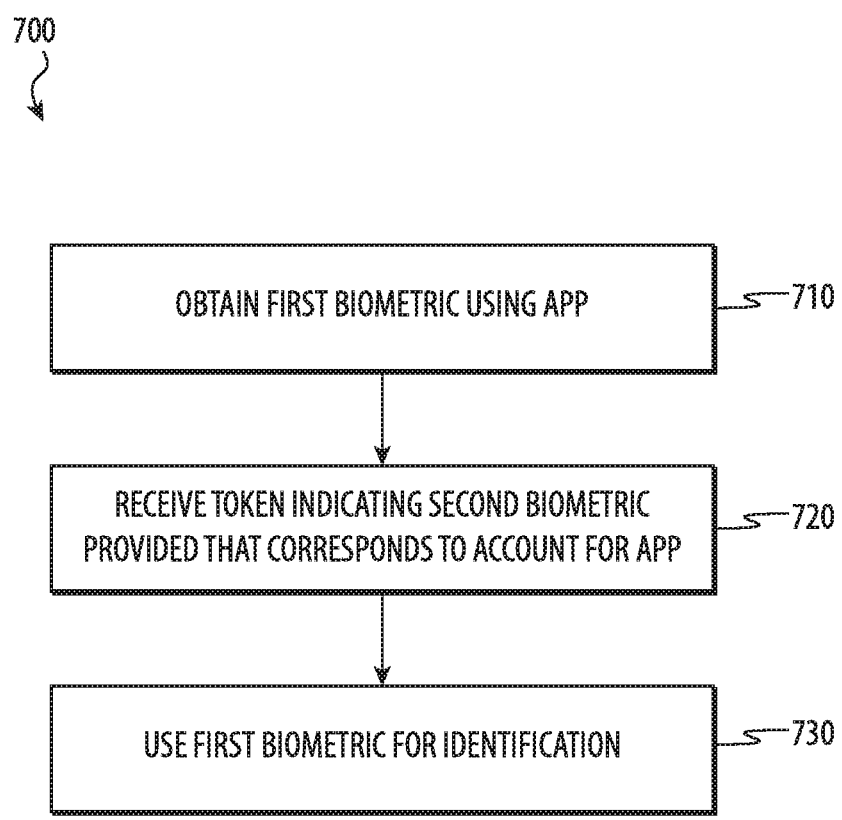
FIG. 7 depicts a flow chart illustrating a fifth example method for mobile biometric identification system enrollment using a known biometric. This method may be performed by the system of FIG. 1.

FIG. 7 depicts a flow chart illustrating a fifth example method 700 for mobile biometric identification system enrollment using a known biometric. This method 700 may be performed by the system 100 of FIG. 1.

At operation 710, an electronic device (such as the identity system device 101 of FIG. 1), may obtain a digital representation of a first biometric using one or more apps or applications. At operation 720, the electronic device may receive an authorization and/or other token indicating that a digital representation of a second biometric was provided that corresponds to an account for the app. At operation 730, the electronic device may use the digital representation of the first biometric for identification.

In various examples, this example method 700 may be implemented as a group of interrelated software modules or components that perform various functions discussed herein. These software modules or components may be executed within a cloud network and/or by one or more computing devices, such as the identity system device 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, operation 730 is illustrated and described as using the electronic device using the digital representation of the first biometric for identification. However, it is understood that this is an example. In various implementations, the electronic device may perform operation 730 by enrolling a person who provided the digital representation of the first biometric in a biometric identification system using the digital representation of the first biometric. Various configurations are possible and contemplated without departing from the scope of the present disclosure.

In various implementations, a system for mobile biometric identification enrollment may include at least one non-transitory storage medium that stores instructions and at least one processing unit. The at least one processing unit may execute the instructions to obtain a digital representation of at least one fingerprint for a person; obtain an image of an identification token for the person; enroll the person in a biometric identification system using the digital representation of the first biometric; upon an initial attempt to identify the person using the digital representation of the first biometric, authenticate the digital representation of the first biometric by matching a digital representation of a second biometric for the person to data derived from the image of the identification token; and identify the person using the digital representation of the first biometric after verification.

In some examples, liveness detection may be performed during capture of the digital representation of the first biometric. In various examples, the identification token may be at least one of a state identification card, a driver's license, a military identification card, or a passport. In a number of examples, the identification token may include at least a picture of at least a portion of the person. In some such examples, the biometric data may be derived from the picture of the at least the portion of the person. In various examples, the digital representation of the first biometric and the digital representation of the second biometric may be received from different electronic devices. In a number of examples, the digital representation of the first biometric and the digital representation of the second biometric may be received by a same electronic device.

In some implementations, a system for mobile biometric identification enrollment may include at least one non-transitory storage medium that stores instructions and at least one processing unit. The at least one processing unit may execute the instructions to obtain a digital representation of a first biometric for a person; enroll the person in a biometric identification system using the digital representation of the first biometric; upon an initial attempt to identify the person using the digital representation of the first biometric, authenticate the digital representation of the first biometric by matching a digital representation of a second biometric for the person to known biometric data for the person; and identify the person using the digital representation of the first biometric after verification.

In various examples, the first biometric may be at least one fingerprint and the second biometric may be at least a portion of a face. In some examples, the first biometric may be at least a portion of a face and the second biometric may be at least one fingerprint. In a number of examples, the digital representation of the first biometric may be received from an electronic device controlled by the person. In various examples, the first biometric may be of a first modality and the second biometric may be of a second modality. In a number of examples, the first biometric and the second biometric may be of a same modality. In some examples, the at least one processing unit may prompt for the digital representation of the second biometric.

In a number of implementations, a system for mobile biometric identification enrollment may include at least one non-transitory storage medium that stores instructions and at least one processing unit. The at least one processing unit may execute the instructions to obtain a digital representation of a first biometric for a person; enroll the person in a biometric identification system using the digital representation of the first biometric; authenticate the digital representation of the first biometric by determining that a digital representation of a second biometric for the person matches a digital representation of the known biometric; and identify the person using the digital representation of the first biometric after verification.

In some examples, the at least one processing unit may receive an indication that the digital representation of the second biometric matches the digital representation of the known biometric. In various of such examples, the indication may be an authorization token. In a number of examples, the at least one processing unit may not be able to access the digital representation of the second biometric. In various examples, the at least one processing unit may authenticate the digital representation of the first biometric when identifying the person using the digital representation of the first biometric. In some examples, the at least one processing unit may disable identification for the person upon unsuccessfully attempting to authenticate the digital representation of the first biometric.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to mobile biometric identification system enrollment using a known biometric. The system receives a digital representation of a first biometric for a person. Prior to using the digital representation of the first biometric to identify the person, the system compares a received digital representation of a second biometric for the person to known biometric data for the person. When the digital representation of the first biometric has been thus verified, the system is operative to identify the person using the digital representation of the first biometric.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method, comprising:
receiving, using at least one processor, a digital representation of a first biometric for a person;
determining, using the at least one processor, that the digital representation of the first biometric is unverified as associated with an identity of the person;
receiving, using the at least one processor, a digital representation of a second biometric for the person that corresponds to a different body part than the digital representation of the first biometric; and upon using the at least one processor to determine that the digital representation of the second biometric is verified as associated with the identity of the person, verify the digital representation of the first biometric as associated with the identity of the person.

2. The method of claim 1, wherein:

the digital representation of the first biometric corresponds to an image of at least a portion of a face; and the digital representation of the second biometric corresponds to a fingerprint.

3. The method of claim 1, wherein the at least one processor receives the digital representation of the first biometric from a same electronic device as the digital representation of the second biometric.

4. The method of claim 1, wherein the digital representation of the first biometric is determined as unverified because the digital representation of the first biometric is previously unassociated with the identity of the person.

5. The method of claim 1, wherein the digital representation of the first biometric is determined as unverified because the digital representation of the first biometric is previously associated with the identity of the person through receipt of the digital representation of the first biometric from a remote electronic device.

6. The method of claim 1, further comprising using the digital representation of the first biometric to identify the person after verification.

7. The method of claim 1, further comprising using the at least one processor to verify that the digital representation of the second biometric is associated with the identity of the person using an identification token.

8. A method, comprising:

determining, using at least one processor, that a digital representation of a first biometric provided by a person for identification is unverified as associated with an identity of the person;

prompting, using the at least one processor, for a digital representation of a second biometric for the person wherein the digital representation of the first biometric is a different type of biometric than the digital representation of the second biometric; and upon using the at least one processor to verify that the digital representation of the second biometric is associated with the identity of the person, authorize use of the digital representation of the first biometric for the identification.

9. The method of claim 8, further comprising identifying the person using the digital representation of the first biometric.

10. The method of claim 8, further comprising using the at least one processor to verify that the digital representation of the second biometric is associated with the identity of the person by comparing the digital representation of the second biometric to data derived from an identification token.

11. The method of claim 10, wherein the identification token includes at least a picture of at least a portion of the person.

12. The method of claim 8, further comprising using the at least one processor to verify that the digital representation of the second biometric is associated with the identity of the person by comparing the digital representation of the second biometric to data derived from a monitored biometric capture.

13. The method of claim 8, further comprising using the at least one processor to verify that the digital representation of the second biometric is associated with the identity of the person by comparing the digital representation of the second biometric to a known biometric.

14. The method of claim 8, wherein:

the digital representation of the first biometric corresponds to a fingerprint; and the digital representation of the second biometric corresponds to an image of at least a portion of a face.

15. A method, comprising:

determining, using at least one processor, that a digital representation of a first biometric provided by a person for identification is unverified as associated with an identity of the person;

attempting, using the at least one processor, to verify that a digital representation of a second biometric for the person is associated with the identity of the person wherein the digital representation of the first biometric is a different biometric modality than the digital representation of the second biometric; and upon using the at least one processor to determine that the digital representation of the second biometric is verified, verify the digital representation of the first biometric.

16. The method of claim 15, further comprising identifying the person using the digital representation of the second biometric.

17. The method of claim 15, further comprising capturing the digital representation of the first biometric and the digital representation of the second biometric at a same time.

18. The method of claim 15, further comprising:

capturing the digital representation of the first biometric at a first time; and capturing the digital representation of the second biometric at a second time.

19. The method of claim 18, wherein the second time is after the first time.

20. The method of claim 15, wherein the at least one processor determines that the digital representation of the first biometric is unverified because the digital representation of the first biometric has not been previously presented to identify the person.

\* \* \* \* \*